Aug. 2, 1932.                D. B. KNIGHT                1,869,853
                ABSORPTION TYPE REFRIGERATING APPARATUS
                         Filed June 10, 1931
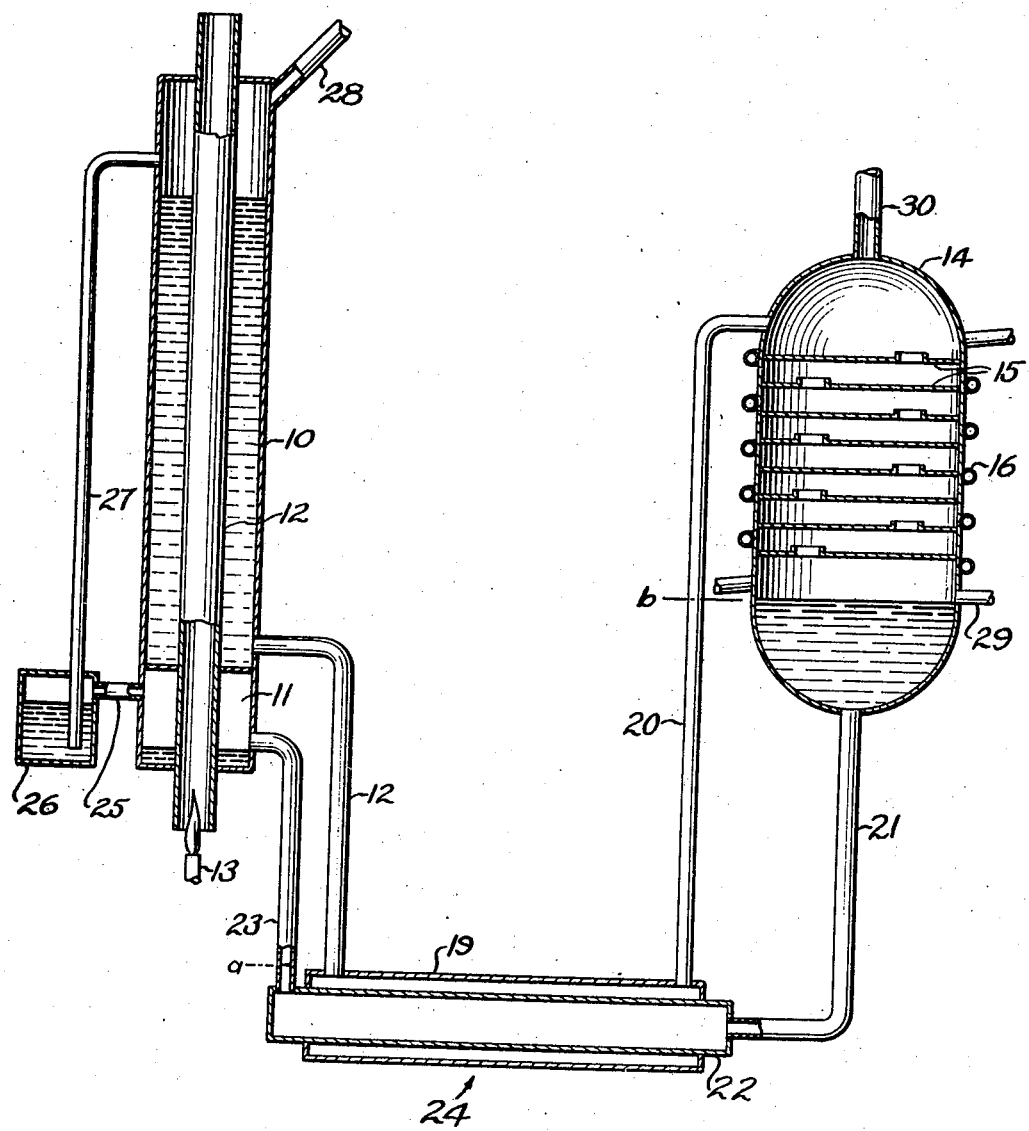
INVENTOR.
D. B. KNIGHT
BY
ATTORNEY Patented Aug. 2, 1932

1,869,853

UNITED STATES PATENT OFFICE

DONALD B. KNIGHT, OF BROOKLYN, NEW YORK, ASSIGNOR TO ELECTROLUX SERVEL CORPORATION, OF NEW YORK, N. Y., A CORPORATION OF DELAWARE

ABSORPTION TYPE REFRIGERATING APPARATUS

Application filed June 10, 1931. Serial No. 543,277.

This invention relates to absorption refrigerating apparatus of the pressure equalized type and more particularly to the circulation of absorption liquid between the absorber and generator in such apparatus.

One object of this invention is to provide an improved vapor liquid pump for raising enriched absorption liquid from the absorber into the generator.

Further objects and advantages will be apparent from the following description when taken in connection with the accompanying drawing which shows the generator and absorber of a well known pressure equalized type of absorption refrigerating apparatus and the pumping system contemplated by this invention for raising absorption liquid from the absorber to the generator.

In the drawing, the generator 10, containing a solution of refrigerant in an absorption liquid, and a lower pressure chamber 11 are constructed as a single unit and adapted to be heated by a flue 12 over a burner 13. The absorber 14 constructed in a well known manner with baffle plates 15 is cooled by water circulating through coil 16. The lower part of boiler 10 is connected to the upper part of the absorber 14 through conduit 18, outer casing 19 of the liquid heat exchanger 24, and conduit 20. The lower part of the absorber is connected to the pressure chamber 11 below the generator through conduit 21, inner casing 22 of the liquid heat exchanger 24, and conduit 23.

From the upper part of pressure chamber 11 an overflow pipe 25 is connected to the upper part of the fluid tight pump vessel 26. A pump pipe 27 extending from the lower part of pump vessel 26 discharges into the upper part of the generator 10.

In operation, refrigerant gas expelled from solution in the generator by heat passes through conduit 28 to the condenser and evaporator, not shown, which are usual parts of the apparatus. As well known in the art the liquid refrigerant from the condenser vaporizes into an inert pressure equalizing gas in the evaporator and the resulting gas mixture enters the absorber 14 through conduit 29. Weak absorption liquid from the generator entering the upper part of the absorber through conduit 20 passes down over the baffle plates 15 absorbing refrigerant gas from the gas mixture passing upwardly through the baffle plates. The inert gas returns from the absorber to the evaporator through conduit 30 and enriched absorption liquid accumulates in the lower part of the absorber from where it flows through conduit 21, liquid heat exchanger 24, and conduit 23 into the chamber 11 which is heated by the flue 12.

Starting at a point in the pumping cycle where the pressure chamber 11 and pump vessel 26 are empty, rapid boiling of the liquid entering chamber 11 will occur for a short interval of time and the vapor generated passes through pipe 25, pump vessel 26, and pump pipe 27 into the generator. As the liquid continues to flow into chamber 11 the latter is cooled and boiling ceases since the liquid entering at a temperature below its boiling point flows faster than the heating means can raise its temperature to the boiling point. The vapor remaining in the chamber 11 and pump vessel 26 is absorbed by the incoming liquid which continues until chamber 11 and, by overflow through pipe 25, pump vessel 26 are completely filled with liquid when the flow from the absorber ceases.

When the supply of cool liquid ceases the liquid in chamber 11 is brought to a boil and vapor is generated which accumulates in the upper part of the chamber. As the pressure of the accumulating vapor increases liquid is forced downwardly in chamber 11 and back through conduit 23 toward the absorber. Since pump vessel 26 and chamber 11 are in communication through the overflow pipe 25 the vapor pressure in chamber 11 will be exerted in the pump vessel forcing liquid therein upwardly through the pump pipe 27 into the upper part of boiler 10.

Liquid is forced downwardly in conduit 23 to some level $a$ such that the liquid column represented by the height $b$ of the liquid in the absorber above the level $a$ balances the liquid column in the pump pipe 27. When all the liquid in pump vessel 26 above the opening of the pump pipe is pumped into the generator the vapor pressure is exerted directly on the liquid column in the pump pipe which is expelled into the generator thus relieving the pressure in chamber 11 and pump vessel 26, whereupon absorption liquid under pressure of the absorber liquid column again flows into chamber 11 and the cycle is repeated.

It will be obvious to those skilled in the art that various other changes may be made in the construction and arrangement without departing from the spirit of the invention and therefore the invention is not limited to what is described in the specification and shown in the drawing but only as indicated in the appended claims.

I claim:

1. In absorption refrigerating apparatus of the pressure equalized type an absorption liquid circulating system including a generator, heating means for said generator, an absorber, a liquid heat exchanger, a conduit from the lower part of said generator to the upper part of said absorber including one element of said heat exchanger, a fluid tight chamber below said generator and adapted to be heated by said generator heating means, a conduit from the lower part of said absorber to the lower part of said chamber including the other element of said heat exchanger, a fluid tight pump vessel, an overflow conduit from the upper part of said chamber to the upper part of said pump vessel, and a pump pipe from the lower part of said pump vessel to the upper part of said generator.

2. In absorption refrigerating apparatus of the pressure equalized type an absorption liquid circulating system including a generator, an absorber, a liquid heat exchanger, a conduit from the lower part of said generator to the upper part of said absorber including one element of said heat exchanger, a fluid tight pressure chamber, heating means for said chamber, a conduit from the lower part of said absorber to the lower part of said chamber including the other element of said heat exchanger, a fluid tight pump vessel, a conduit from the upper part of said chamber to the upper part of said pump vessel, and a pump pipe from the lower part of said pump vessel to the upper part of said generator.

3. In absorption refrigerating apparatus of the pressure equalized type a fluid tight chamber below the generator and adapted to be heated by the generator heating means, a connection from the lower part of the absorber to the lower part of said chamber, a fluid tight pump vessel, an overflow connection from the upper part of said chamber to the upper part of said pump vessel, and a pump pipe from the lower part of said pump vessel to the upper part of the generator.

4. In absorption refrigerating apparatus of the pressure equalized type a fluid tight pressure chamber, heating means for said chamber, a conduit for enriched absorption liquid from the absorber to the lower part of said chamber, a fluid tight pump vessel, an overflow conduit from the upper part of said chamber to the upper part of said pump vessel, and a pump pipe from the lower part of said pump vessel to the upper part of the generator.

5. In absorption refrigerating apparatus of the pressure equalized type an absorption liquid circulating pump comprising a fluid tight chamber, heating means for said chamber, an absorption liquid inlet in the lower part of said chamber, a fluid tight pump vessel, a conduit from the upper part of said chamber to the upper part of said pump vessel, and a pump pipe extending upwardly from the lower part of said pump vessel.

6. A vapor liquid pump comprising two fluid tight chambers in communication at their upper portions, a liquid inlet in the lower part of one of said chambers, heating means for the last said chamber, and a discharge pipe extending upwardly from the lower part of the other of said chambers.

7. A vapor liquid pump comprising a fluid tight chamber, heating means for said chamber, a fluid tight pump vessel, a conduit from the upper part of said chamber to said pump vessel, a liquid inlet in the lower part of said chamber, and a discharge pipe extending upwardly from the lower part of said pump vessel.

8. In the art of refrigerating with absorption refrigerating apparatus of the pressure equalized type the method of circulating absorption liquid which includes continuously heating a fluid tight chamber and supplying said chamber with enriched absorption liquid from the absorber at a rate such that the liquid does not reach its boiling temperature until the chamber contains the desired amount of liquid.

9. In the art of circulating liquid by the application of heat the method which includes continuously heating a fluid tight chamber and supplying liquid to the chamber at a rate such that the liquid does not reach its boiling point until the chamber contains the desired amount of liquid.

In testimony whereof I affix my signature.

DONALD B. KNIGHT.